July 24, 1956  J. W. WELSH  2,756,304
SNAP-ACTION DEVICE
Filed Aug. 18, 1953  3 Sheets-Sheet 1
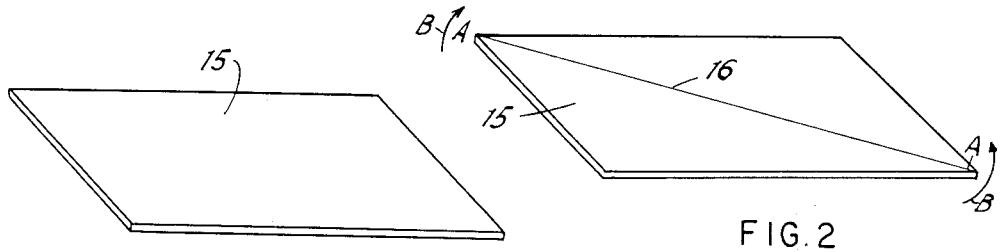
FIG. 1
FIG. 2
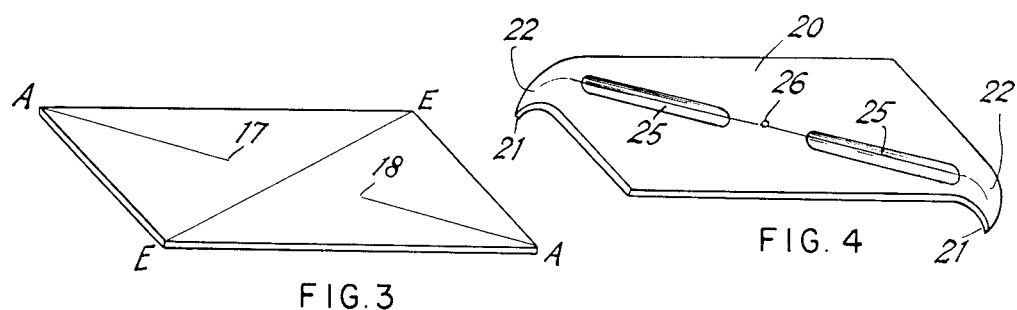
FIG. 3
FIG. 4
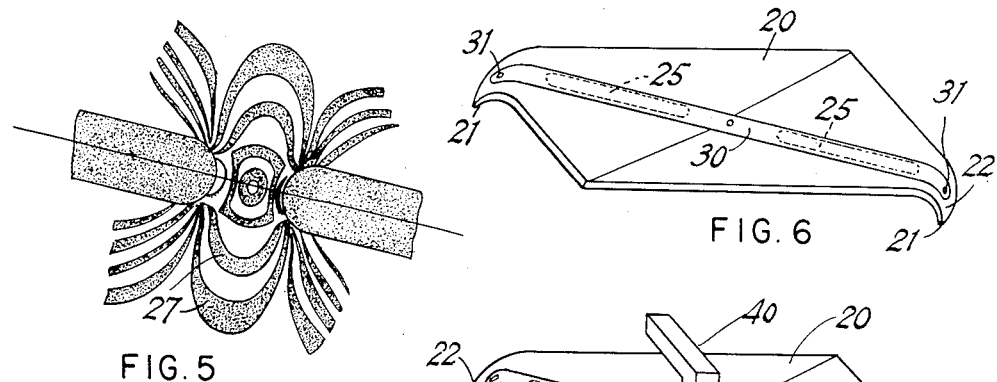
FIG. 5
FIG. 6
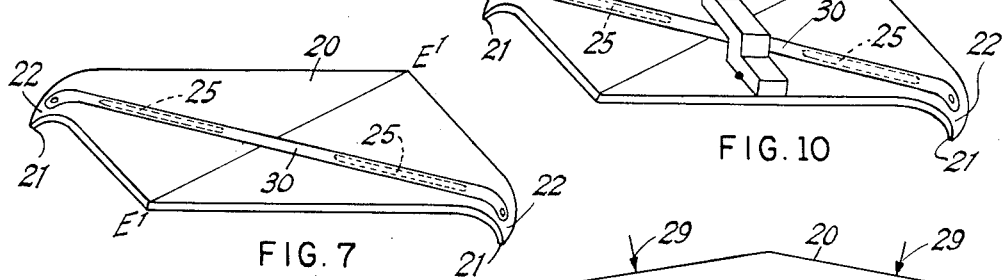
FIG. 7
FIG. 10
FIG. 8
FIG. 9
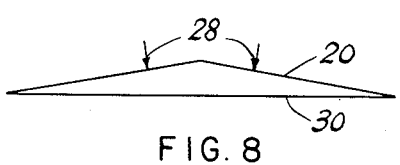
INVENTOR
James W Welsh
BY
ATTORNEY July 24, 1956  J. W. WELSH  2,756,304
SNAP-ACTION DEVICE
Filed Aug. 18, 1953  3 Sheets-Sheet 2

INVENTOR
James W Welsh
BY
ATTORNEY

United States Patent Office

2,756,304
Patented July 24, 1956

2,756,304

SNAP-ACTION DEVICE

James W. Welsh, Summit, N. J., assignor to Signal-Stat Corporation, Brooklyn, N. Y., a corporation of New York Application August 18, 1953, Serial No. 374,976

9 Claims. (Cl. 200—122)

This invention relates to snap action devices and, more particularly, to an improved vane or spring adapted to snap from a predetermined conformation to a different conformation upon the application thereto of a predetermined force and to snap back to the predetermined conformation upon the release of such force.

Devices of this type are known in which a flat vane or spring, generally circular in plan, has a predetermined "set" embedded thereto by an initial bending along a line extending across the vane, for example a diametric line in the case of a circular vane. This predetermined bending is applied in such a way that the vane has the section of a shallow V with the bending line as its apex. When a bending force is applied to the vane in a direction angularly related to the initial bend, as at substantially right angles thereto, for example, the V tends to flatten along its mid-portion and, as the applied force reaches a preset value, the vane snaps into a new shallow V with the apex extending perpendicularly to the line of application of the force. As the applied pressure is released, the vane snaps back into its original shallow V form about the initial bending line as an apex.

In effect, an arrangement of this type comprises the equivalent of a toggle joint by which a comparatively small force can produce or balance a larger force as the angle of the V approaches 180 degrees. The material used for such vanes is selected carefully for certain qualities such as high elasticity, resistance to creep under static and dynamic conditions, specific electrical resistance, temperature coefficient of resistance, coefficient of linear expansion, etc. All of these factors must be carefully correlated in accordance with the desired formation of the vane.

Devices of this character have found numerous applications, among which is their use in snap action electrical switches. A particular example of the latter use is a flasher for flashingly energizing signal lamps or the like. When a snap action device of the described character is used in a flasher, a high resistance wire, which is connected in the electrical circuit, is used as the force applying means. Such wire may be attached at both ends to the snap action vane while the latter is forcibly bent along a line at an angle to the preset bending. As the wire is heated with the passage of electric current, the wire expands and thus releases the force applied to the vane. The latter then snaps back to its preset bent condition. Contact arrangements are provided whereby the electric circuit is broken as the vane snaps back to its preset form and the circuit is reclosed when the resistance wire has contracted sufficiently to again distort the vane from its preset bent condition.

The aforegoing effects cannot be accomplished with a vane that is simply a flat piece of material. Stiffness must be added to the vane in a preferably predetermined amount dependent upon the expected force to be applied, so that the vane will have some of the stress resistant, characteristic of a beam. This is done by the aforementioned initial bending of the vane. This bend provides the necessary depth to the vane so that the snap action will take place before the applied force exceeds the elastic limit of the material. The comparison of the deformed vane to a beam is not totally accurate, as such a vane differs somewhat from a beam as the depth and breadth of the vane varies during the application of force by virtue of the progressive flattening of the initial bend or V.

The formed channels or bends extending substantially completely across the vane, and which, have hereto been used in many applications, are satisfactory when a relatively great amount of bend force is available. However, this expedient is not satisfactory in applications where only low bending power is available, so that no loss can be tolerated. It has been found, with the type of "thru" bend or deformation hereto used, that the breakdown point at the center of the bend line will fatigue after a number of cycles, thus changing the amount of pressure needed to effect the snap action. This is undesirable as it is usually necessary that such devices snap from one position to the other upon the application or release of a determined value of force. This predetermined value of force is set by properly designed parameters of the vane as to length, breadth, depth of initial deformation, and characteristics of the vane material.

The present invention is directed to a new type of snap action vane in which the bending point of the material is removed from the center of the bending line thereof so that the center section of the vane is kept unmarred. In accordance with the invention, the bending stresses are concentrated at points spaced from the center of the vane, as by forming the bending line as a discontinuous line or a pair of longitudinal spaced embossings or bosses, depressions, bends, or thinned sections. For example, a pair of bosses or indentations are formed in the vane which are in line with each other and spaced equidistant from the center of the vane and from the edges thereof. This method of forming the vane removes the bending stresses from the center to points between the ends of the bosses. In accordance with the invention, the bending points can be shifted by properly selecting the point of attachment of the vane to a suitable mounting member.

For an understanding of the invention principles, reference is made to the following description of typical embodiments thereof as illustrated in the accompanying drawings.

Fig. 1 is a perspective view of a flat vane of regular form which may be used as the starting point of the invention devices;

Fig. 2 is a perspective view of a flat vane of regular form having an initial bend along a diagonal;

Fig. 3 is a perspective view illustrating the vane of Fig. 2 when force is applied at opposite ends of the diagonal;

Fig. 4 is a perspective view of a vane deformed in accordance with the present invention.

Fig. 5 is a partial plan view, reproduced from a photograph made by using polarized light on the invention vane, and showing the stress lines adjacent the center of the vane;

Fig. 6 is a perspective view of the invention vane with a high resistance wire having its ends secured to the vane, to act as a stressing medium, the vane being illustrated in the preset or restored position;

Fig. 7 is the perspective view of the arrangement of Fig. 6 with the resistance wire contracted to distort the vane from its preset position;

Figs. 8 and 9 are diagrams illustrating the bending point locations of the invention vane;

Fig. 10 is a perspective view of the vane of Figs. 6 and 7 with a mounting member attached thereto;

Figure 11:
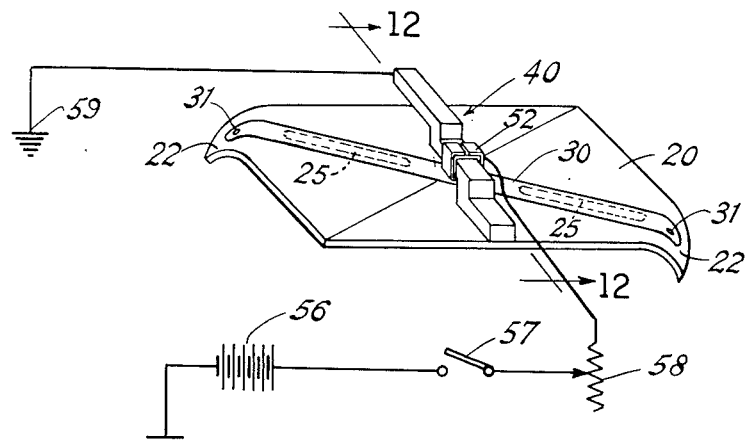
Fig. 11 is a view similar to Fig. 10 showing the invention vane used as a snap action switch.

Referring to Fig. 1 of the drawing, a flat vane 15 is illustrated which is suitable for use as an invention vane, when deformed in accordance with the invention and as described hereinafter. If the vane 15 of Fig. 1 has forces applied to any surface, bending will occur. The degree of bending is determined by the value of the applied force, as resisted by the stiffness factor of the material. In order to allow the application of increased force without exceeding the elastic limit of the material, depth must be added to the vane so that it will act somewhat in the same manner as a beam.

Fig. 2 illustrates the vane 15 with depth added to it. In this case, the depth is added by imparting an initial bend to the vane along the diagonal AA, so that the vane has the shape of a shallow V with its apex along diagonal AA.

If bending forces are applied to the ends of a diagonal AA, as indicated by the arrows BB, the bending line AA will break down at its weakest point, which theoretically is at midway or center 16 of the line of channel AA. The forces BB first act on the vane in the same manner as if the latter were an I-beam. However, as the forces BB are applied to sides C and D, the vane tends to flatten. The flatter the sides, the greater the breadth of the beam and thus the greater amount of force required to break down the channel AA. Therefore, the forces BB must obtain a relatively high value before the vane completely flattens into a new conformation as determined by the forces BB.

Fig. 3 illustrates the vane 15 in the snapped position. The channel or line AA has flattened substantially to the points 17 and 18, and vane 15 has assumed a new bend along the opposite diagonal EE. The channel EE, not being completely formed, opposes the forces BB, and as these forces are decreased the channel EE will snap the vane back to its original bent position along the diagonal AA. The speed of passage of the vane through the equilibrium point, in which the force of any channel EE substantially balances the applied force BB, can be determined by proper selection of parameters, such as the type of material, the amount of initial bending along line BB, etc.

Referring to Fig. 4, in accordance with the present invention, a vane 20 is formed from the flat piece 15 by forming two elongated embossings or bosses 25—25 in longitudinally spaced relation along the vane diagonal. The bosses are so related that their inner ends are spaced longitudinally from the vane center 26 and their outer ends preferably terminate short of the corners 21—21 determining the ends of the diagonal along which lie the bosses 25—25. This leaves the area at the center of the vane, and between the inner ends of bosses 25—25, substantially unmarred. The corners 21—21 are shown bent downwardly, as at 22—22, for a purpose to be described.

Referring to Fig. 6, the application of bending forces to the vane 20 may be effected by means of an expansible high resistance wire or flat strip 30 which has its ends welded to the bent corners 22 as at 31, 31.

Fig. 6 illustrates vane 20 with wire 30 expanded a sufficient amount to allow vane 20 to remain in its initial preset deformed condition. Wire 30 is carefully selected as to its coefficient of expansion including rise in temperature, its tensile strength, its linear expansion, its spring constant and its thermal restivity. By careful selection of these parameters, the speed of the snap action and the required amount of force may be accurately set. In the use of the vane 20 as an electrically controlled expansion device, the wire 30 is preferably secured to the back corners 22 of vane 20 with the vane stressed, as in Figs. 2, 3 and 7, to bend along the diagonal E'E' whereby, when an electric current is passed through wire 30, the latter will expand. After a predetermined amount of expansion with consequent releases of the forces acting between corners 22, 22, the vane will snap to the position of Fig. 6.

Referring to Fig. 5, which is reproduced from a photograph made by using a transparent plastic vane with polarized light, the stresses of the invention vane radiate from the center in the form of ellipses as indicated by the lines 27.

Figs. 8 and 9 show the shifting of the pivot point of the vane under the applied stresses when the vane is formed with the bosses 25. Thus, instead of the pivot being at the vane center 26, two pivot points occur at the inner ends of the bosses 25, these pivot points being indicated at 28—28. The vane actually has pivot points along the embossed sections 25. These embossed sections also direct the force. If the focal point of the force is placed at one of the curves 27 of the ellipses shown in Fig. 5, as by mounting or supporting the vane at its point, it will act to move the free pivot points from the inner ends of the bosses 25 toward the outer ends thereof, as illustrated at 29—29 in Fig. 9. While two physical pivot points are thus provided, they are symmetrical and in line with the applied stresses so that one of these pivot points is all that need be used in a practical application.

With the wire 30 as the force applying means working at the corners 22 of the vane, the shifting of the pivot point 29 towards these corners increases the mechanical advantage of the applied force relative to the center of the vane, considering the vane 20 and the wire 30 as a lever system. Thereby a relatively small movement of wire 30 at the points 22 results in a relatively large movement of the center 26 of the vane.

In the present invention, this mechanical advantage is obtained by utilizing one of the focal points 29 located on one of the ellipse curves 27, or stress focusing loci, as the mounting point for the vane. This is illustrated in Fig. 10, wherein a relatively rigid and preferably electrically conductive mounting bracket 40 is shown as attached to vane 20 at point 41 by means of spot welding or the like. With the bracket 40 thus attached and mounting vane at the point 41, the vane can effectively be utilized as a snap action switch.

Figure 12:
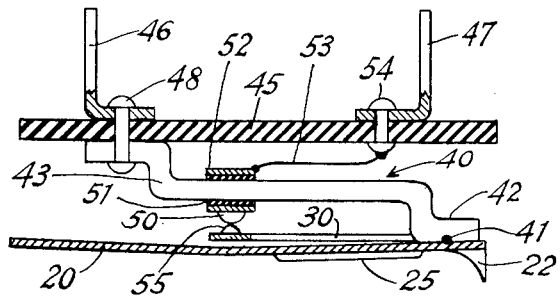
Fig. 12 is a part sectional, part elevation view taken on the line 12—12 of Fig. 11.

Referring to Figs. 11 and 12, the vane is illustrated with one end 42 of bracket 40 mounted on a dielectrical base 45 having prongs or terminals 46 and 47. Preferably, a rivet 48 interconnects bracket 20 and contact 46. The other end of bracket 40 is secured to vane 20 at the point 41 by welding or brazing. To form the electrical circuit or switch the mid-section 43 of bracket 40 is wrapped with a layer of dielectric material 51 around which is wrapped a band 52 of conductive material to which is secured a contact point 50.

A conductor 53 connects contact point 50 to a rivet 54 securing prong or terminal 46 to base 45. The high resistance wire or strip 30 carries a second contact 55 disposed for co-action with contact 50 when the vane occupies the form illustrated in Figs. 10 and 11.

Referring to Fig. 11, a grounded battery 56 is connected through a switch 57 to a resistance 58. The latter is connected, as through the prong 47, rivet 54 and conductor 51, to the band 52 and thus the contact point 50. The prong 46, which is connected to the end 41 of bracket 40, is grounded as at 59. With the parts occupying the positions shown in Figs. 11 and 12, when switch 57 is closed, current flows through resistance 58, prong 57, rivet 54, conductor 53, band 52, contact 50 and contact 55 to the center of wire 30. There the current divides and flows through the two halves of wire 30, in parallel, to the ends 52 of vane 20. The current then flows through vane 20, weld or attachment point 41, and bracket 40 to ground 49. As current flows through wire 30, the latter becomes heated and expands.

This releases the bending force applied to the vane at corners 22, and vane 20 snaps from the position shown in Figs. 10 and 11 to that shown in Fig. 6. Due to the resultant downward movement of wire 30 (as viewed in Fig. 11), contact point 55 disengages contact point 50 and breaks the heating circuit for wire 30. The latter thereupon cools and contracts and, after a predetermined contraction, the force applied by the contracting wire to points 22 snaps vane 20 back to the position of Figs. 7, 11 and 12. The cycle then repeats.

The bending of the vane under the contraction of wire 30 stores up kinetic energy in the vane so that, when wire 30 again expands, the kinetic energy snaps the vane back to the position of Fig. 6. Thus, the action of the wire, under the make and break electrical system illustrated, alternately stores and releases kinetic energy in vane 20.

Figure 13:
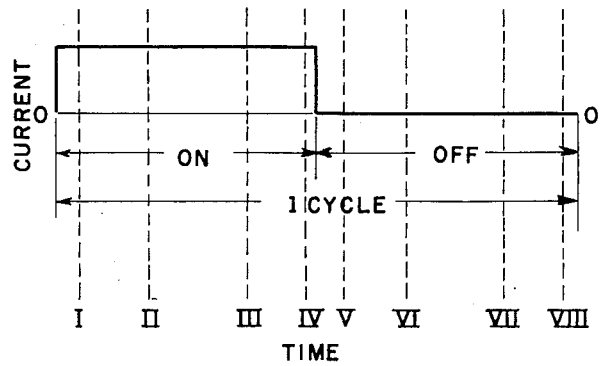
Fig. 13 is a cycle diagram illustrating the action of the switch shown in Figs. 11 and 12.

A graphical representation of the action and relative positions of wire 30 and vane 20 is illustrated in Figs. 14a through 14h with the successive positions illustrated in these diagrams corresponding to the positions I through VIII in the cycle diagram of Fig. 13. The lines 1 through 5 on either side of Figs. 14a through 14h are scale lines indicating the relative outward and inward movements of the corners of vane 20. The horizontal lines to the left of each figure form a scale to represent the relative vertical movement of the vane corners, the line F shows the relative position of the mounting bracket 40, the line L is the relative equilibrium point representing the balance force as the center of the vane flattens out, the V-shaped line 20 is the vane, and the line 30 is the resistance wire. The angle V represents the angle which the vane makes with a plane perpendicular to the vane mounting.

Fig. 14a shows the vane without any pressure on the contacts. Wire 30 is so adjusted that vane 20 is in a snapped position. The center section is raised due to the mechanical advantage effected by mounting the vane at the stress focal point on the elliptical lines of force as shown in Fig. 5. In the position shown, wire 30 has cooled and is just starting to heat due to flow of current therethrough. It is just at its shortest length, illustrated as touching the lines 2, 2, the vane making a hypothetical angle V. Angle V is large, indicating that the vane 20 is under great stress. However, a small amount of force will hold the vane due to the large angle V, the arrangement resembling a toggle joint. It should be understood that the illustrated scales are relative only and do not represent actual units of force or stress.

In Fig. 14b, the heating of wire 30 has increased so that the wire has expanded to the lines 3, 3. The center section of vane 20 has lowered from point 9 to point r due to flattening of the center section. Wire 30, when elongating, tends to raise corners 22 of the vane, but the center section, being higher, will effect an overall lowering relative to the mounting plane of the vane. The pressure on wire 30 necessary to hold the vane angle is greater due to the decrease in angle V.

Figure 14:
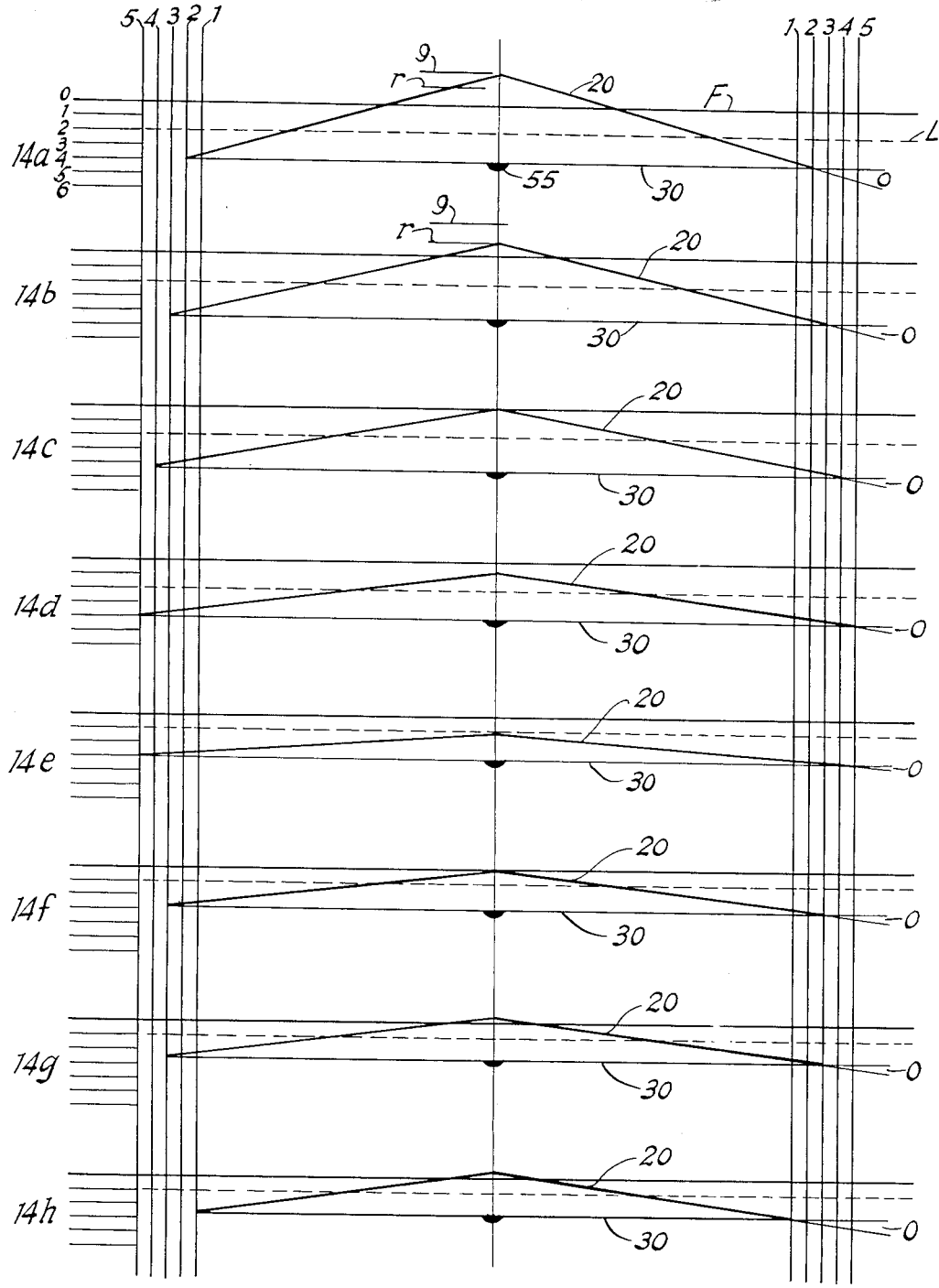
Figs. 14a through 14h are diagrams illustrating the operation of the invention vane when used in snap action switches.

Fig. 14 illustrates the wire expanded to the lines 4, 4. The tension in the wire is greatly increased due to the increase of angle V, and the center section of vane 20 is approaching the flat condition and moves a lesser amount in a downward direction.

Fig. 14d shows the condition with a further heating and resultant expansion of wire 30. The latter has now expanded to points 5, 5, the center section of vane 20 is flat, and angle V is decreased thus increasing the force on wire 30. This section represents a period of fast acceleration and the action actually takes place in a minute section of time.

Fig. 14e indicates the next position after that of Fig. 14d. In this position, the vane has snapped, transforming the bending line from diagonal AA to diagonal EE and forming a new channel. However, wire 30 is still working along the diagonal AA. With the wire expanding, the force is created by the adjustment of positions but contraction of the wire is effected by the bias or kinetic energy stored in vane 20. As the wire contracts, it does work by building up energy in the vane.

In Fig. 14e wire 30 is close to the mounting plane of the vane. The wire 30 can be considered as having essentially the same length as in Fig. 14d but with a little less pressure due to the snapping of vane 20. The angle V is quite small, but the vane apex angle is smaller thus decreasing the pressure in the wire.

Fig. 14f illustrates the wire after some contracting and build up of pressure in vane 20. Angle V is decreasing, and the pressure in the wire is increasing. The wire length has decreased to lines 3, 3. The vane center section is moving more than line 30 and, therefore, wire 30 is moving downward relative to the mounting plane.

Fig. 14g illustrates the wire as still contracting but beginning to move downward due to the lessening of the upward movement of the vane center as it approaches the flat condition. Due to the center force, stress in wire 30 has increased, thus causing the action to accelerate. Angle V is increasing showing the building up of kinetic energy.

Fig. 14h shows a further contracted position of wire 30 and it will be noted that wire 30 still moves in a downward position. The action is accelerated due to the stresses in wire 30. As the equilibrium point is reached and passed, the vane snaps over to position shown in Fig. 14a.

It should be noted that the pivot point, or frame mounting position, is to one side of the diagonal along which lies the bosses 25. Therefore, the relationship of the center point of the vane changes with respect to the mounting point of the vane.

While a specific embodiment of the invention has been shown and described in detail to illustrate the application of the invention principles, it should be understood that the invention may be otherwise embodied without departing from such principles.

I claim:

1. A snap-action device comprising a substantially uniplanar vane of resilient material; an expansible pull member secured at each end to said vane adjacent the periphery thereof, in contracted condition to bend the vane, and maintain the vane under tension in a stress-deformed condition, about a line extending at an angle to said pull member; a source of electric energy; and a contact directly mounted on and in direct electrical and mechanical contact with said pull member, said contact being initially connected electrically and physically to the source of energy, and being displaced out of such electrical and physical connection when said pull member, upon expansion, releases the tension upon said vane.

2. A snap action device comprising a substantially uniplanar vane of resilient material having a substantially linear preset surface deformation extending thereacross; said deformation being interrupted intermediate its ends to leave the central surface area of the vane free of preset deformation; an electrically conductive expansible pull member secured at each end to said vane to extend parallel to said deformation, and in contracted condition, bending the vane and maintaining the vane under tension in a stress-deformed condition about a line extending at an angle to said deformation; and an electric circuit for said pull member including a pair of contacts, one directly mounted on and in direct electrical and mechanical contact with said pull member, and a source of energy having the other contact associated therewith; said contacts being engaged when said member is contracted and being separated when said pull member, upon expansion, releases the tension upon said vane.

3. A snap action device comprising a substantially uniplanar vane of resilient material having a substantially linear preset surface deformation extending thereacross; said deformation being interrupted intermediate its ends at points equidistant from the vane center to leave the central surface area of the vane free of preset deformation and with elliptical stress concentration loci radiating from the vane center; a mounting member of said vane secured to the latter at a point on one of said loci; and means secured to the vane adjacent the outer ends of the deformation to apply bending stresses thereto parallel to the deformation whereby, under bending stresses periodically applied to and released from said vane adjacent the ends of the deformation to effect snapping at the vane between a stress deformed and restored substantially uniplanar position, the vane will pivot about such mounting point.

4. A snap action device comprising a substantially uniplanar vane of resilient material having a substantially linear preset surface deformation extending thereacross; said deformation being interrupted intermediate its ends at points equidistant from the vane center to leave the central surface area of the vane free of preset deformation and with elliptical stress concentration loci radiating from the vane center; a mounting member for said vane secured to the latter at a point on one of said loci; and means secured to the vane adjacent the outer ends of the deformation to apply bending stresses thereto parallel to the deformation, spaced laterally from said deformation whereby, under bending stresses periodically applied to and released from said vane adjacent the ends of the deformation to effect snapping of the vane between a stress deformed and a restored substantially uniplanar position, the vane will pivot about such mounting point.

5. A snap action device comprising a substantially uniplanar vane of resilient material having a substantially linear preset surface deformation extending thereacross; said deformation being interrupted intermediate its ends to leave the central surface area of the vane free of preset deformation; a mounting member for said vane secured to the latter at a point spaced laterally from said deformation; and means secured to the vane adjacent the outer ends of the deformation to apply bending stresses thereto parallel to the deformation whereby, under bending stresses periodically applied to and released from said vane adjacent the ends of the deformation to effect snapping of the vane between a stress deformed and restored substantially uniplanar position, the vane will pivot about such mounting point.

6. A snap action device comprising a substantially uniplanar vane of resilient material having a substantially linear preset surface deformation extending thereacross; said deformation being interrupted intermediate its ends to leave the central surface area of the vane free of preset deformation; and an expansible conductive pull member secured at each end to said vane adjacent the periphery thereof, under tension and parallel to said deformation, to bend the vane and maintain the vane under tension in a stress-deformed condition; about a line intersecting said deformation at an angle of substantially 90 degrees; a source of electric energy; and a contact directly mounted on and in direct electrical and mechanical contact with said pull member and initially connected electrically by and physically to the source of energy, and being displaced out of such electrical and physical connection when said pull member, upon expansion, releases the tension upon said vane.

7. A snap action device comprising a substantially uniplanar vane of resilient material having a substantially linear preset surface deformation extending thereacross; said deformation being interrupted intermediate its ends to leave the central surface area of the vane free of preset deformation; and an expansible conductive pull member secured at each end to said vane adjacent the outer ends of said deformation, under tension and parallel to said deformation, to bend the vane and maintain the vane under tension in a stress-deformed condition; about a line intersecting said deformation at an angle of substantially 90 degrees; a source of electric energy; and a contact directly mounted on and in direct electrical and mechanical contact with said pull member and initially connected electrically by and physically to the source of energy, and being displaced out of such electrical and physical connection when said pull member, upon expansion, releases the tension upon said vane.

8. A snap action device comprising a vane of resilient material having a substantially linear preset deformation extending thereacross; said deformation being interrupted intermediate its ends to leave the central area of the vane free of preset deformation; an expansible high resistance conductor secured at each end to said vane adjacent the periphery thereof, under tension and parallel to said deformation, to bend the vane about a line intersecting said deformation at an angle of substantially 90 degrees; an electrically conductive mounting member for said vane secured to the latter at a point spaced laterally from said deformation and extending across and in outwardly spaced relation to said resistance conductor; a first contact mounted on the inner side of said mounting means and insulated from the latter; a second contact secured to said conductor and engaged with said first contact when said conductor is cool and under tension; and means for connecting opposite polarity terminals of a source of electricity to said first contact and to said mounting member for flow of current through said conductor to heat and expand the same to relieve such tension for snapping of the vane back to its initially preset deformation; said conductor, when the vane is in the initially preset deformation, being spaced sufficiently from said mounting member to separate said contacts to break the conductor heating circuit.

9. A snap action device comprising a substantially rectangular vane of resilient material having a substantially linear preset deformation extending thereacross along a diagonal of the vane, the vane corners at the end of said diagonal being bent from the general plane of the vane; said deformation being interrupted intermediate its ends at points equidistant from the vane center to leave the central area of the vane free of preset deformation and with curvi-linear stress concentration locii concentric with the vane center; an electrically conductive mounting member for said vane secured to the latter at a point on one of said loci spaced laterally from said deformation whereby, under bending stresses periodically applied to and released from said vane adjacent the ends of the deformation to effect snapping of the vane between a stress deformed and a restored position, the vane will pivot about such mounting; an expansible high resistance conductor secured at each end to the convex outer surface of a different one of said corners, under tension, to extend along said deformation and to bend the vane about its other diagonal to such stress deformed position; said mounting member extending across the central area of the vane and in outwardly spaced relation to said resistance conductor; a first contact mounted on the inner side of said mounting means and insulated from the latter; a second contact secured to substantially the mid-point of said conductor and engaged with said first contact when said conductor is cool and under tension; and means for connecting opposite polarity terminals of a source of electricity to said first contact and to said mounting member for flow of current through said conductor from the mid-point to each end thereof to heat and expand the same to relieve such tension for snapping of the vane back to its restored position; said conductor, in the restored position of said vane, lying along said deformation in relatively widely spaced relation to said mounting member to separate said contacts to break the conductor heating circuit.

References Cited in the file of this patent

UNITED STATES PATENTS

| | | |
|---|---|---|
| 1,967,359 | Hanel | July 24, 1934 |
| 1,988,345 | Vaughn | Jan. 15, 1935 |
| 2,041,775 | Mottlau | May 26, 1936 |
| 2,166,238 | Davis | July 18, 1939 |
| 2,266,537 | Elmer | Dec. 16, 1941 |
| 2,299,562 | Burch | Oct. 20, 1942 |
| 2,615,106 | Schmidinger | Oct. 21, 1952 |
| 2,624,819 | Spina et al. | Jan. 6, 1953 |